May 6, 1958    P. G. MARIOTTI ET AL    2,833,900
ELECTROMECHANICAL CONTINUOUS SCAN CONTACT PROBE
Filed June 30, 1954

INVENTORS.
PAUL G. MARIOTTI
LUCIO M. VALLESE
BY
Roderick B. Torres
ATTORNEYS

United States Patent Office 2,833,900
Patented May 6, 1958

2,833,900

ELECTROMECHANICAL CONTINUOUS SCAN CONTACT PROBE

Paul G. Mariotti, Forest Hills, and Lucio M. Vallese, Brooklyn, N. Y., assignors, by mesne assignments, to the United States of America as represented by the Secretary of the Navy Application June 30, 1954, Serial No. 440,578

3 Claims. (Cl. 201—62)

This invention relates to improvement in apparatus for electric scanning on a resistive surface and more particularly to an electromechanical continuous scan contact probe for potential analog computers.

Various devices have been designed for scanning potential distribution on resistive surfaces utilizing discrete or continuous sliding contact systems. In discrete contact systems, the strip to be scanned is provided with fixed metallic probes distributed over the scanning interval with such a mutual separation as not to modify sinsibly the local value of the surface resistivity. The probes are connected electrically to an equal number of contacts on a rotating commutator. In order to insure satisfactory operation, the metallic surfaces are required to be frictionless, thereby necessitating frequent cleaning and maintenance. In addition to constantly checking the probe surfaces, the scanning information obtained from such systems lacks continuity.

The continuous sliding contact systems overcome the disadvantage of discontinuity of information. However, in such systems the scanning is obtained by means of a spring-loaded contact pressed directly on the resistive surface. Because it is practically impossible to eliminate all friction, noise voltages are generated, thereby, reducing the sensitivity and accuracy of the measurements. Further, the parts of the apparatus subject to contact with other surfaces wear rapidly, necessitating frequent replacement.

It is an object of this invention to overcome the disadvantages described hereinbefore by providing apparatus for continuous electric scanning of the potential distribution on a resistive surface.

Another object of the invention is to provide a revolving contact probe that utilizes friction forces.

A further object is to provide an apparatus having multiple continuous scan contact probes that is relatively simple in construction and easily maintained.

Other objects and many of the attendant advantages of this invention will be readily appreciated as the same becomes better understood by reference to the following detailed description when considered in connection with the accompanying drawings wherein.

In the invention to be hereinafter described there is provided a scan contact probe device that utilizes revolving rather than sliding friction. Sliding contacts are workless if friction forces at the sliding surfaces are zero. On the other hand, revolving contacts are always workless and friction forces are not only harmless but are necessary for proper operation. Thus, by the employment of wheel means as a contact probe there is eliminated the problem of machining surfaces having very low coefficients of friction.

Figures 1, 2:
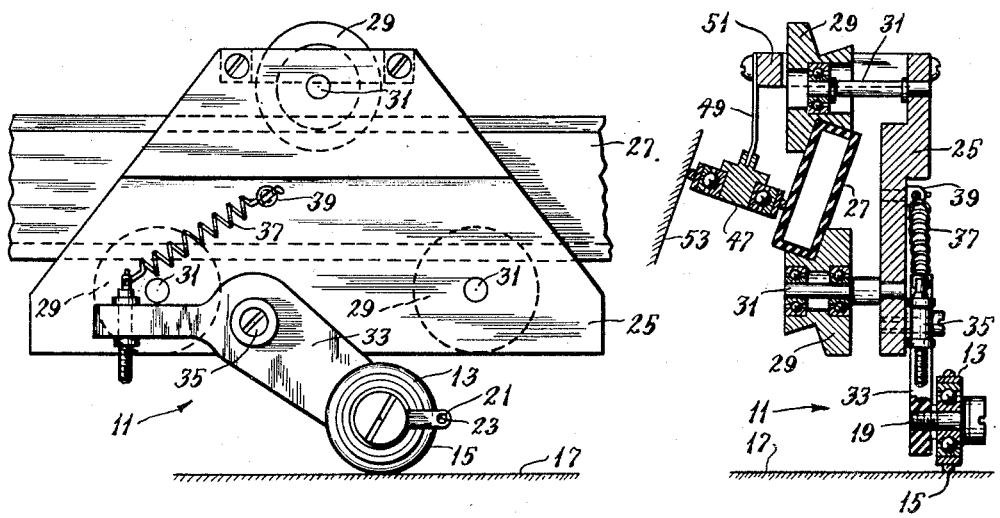
Fig. 1 is a front-elevational view of one embodiment of the invention.
Fig. 2 is a side elevational view in section of the invention shown in Fig. 1.

As seen in Figs. 1 and 2, the probe 11 comprises a small contact wheel 13 having a metallic rim 15 to assure almost-point contact, spring-loaded against a resistive surface 17. Rim 15 is roughened in order to increase the ciefficient of friction between the rim and said resistive surface. The electrical continuity between rim 15 and wheel shaft 19 on which said wheel is mounted can be assured by means of ball bearings properly lubricated. A lug 21 having a hole 23 mounted on shaft 19 provides means for picking off the voltages transmitted from the roughened surface to the wheel.

The wheel shaft 19 is suitably mounted on a lever 33 and insulated therefrom. As indicated, carriage 25 is supported on a single rail 27. Said rail 27, which can be constructed of insulating material, has a rectangular cross-section and is tilted so as to guide a carriage 25 on two diagonal corners by means of a motor and belt arrangement (not shown). Wheels 29 mounted on shafts 31 of carriage 25 engage rail 27 to permit transverse rotational motion of said carriage on said rail. As stated hereinbefore, attached to shaft 19 of wheel 13 is a lever 33 constructed of suitable insulating material. Said lever is adapted to rotate about a pin 35 of carriage 25. A tension spring 37 is suitably connected to the other end of lever 33 and to a pin 39 on carriage 25 in such manner as to constantly urge wheel 13 against resistive surface 17.

Figure 3:
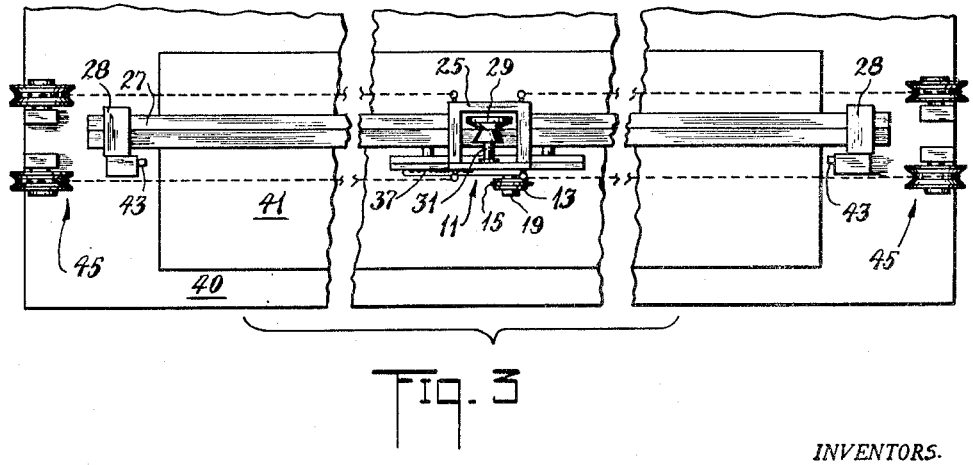
Fig. 3 is a plan view of a portion of an electrostatic analog computer including the invention shown in Figs. 1 and 2.

In one embodiment, a rolling voltage probe 11 can be employed in an electrostatic analog computer to pick up voltages in a conducting plane 41, thereby presenting a continuous scan on a cathode ray oscillograph (see Fig. 3). The contact wheel 13 comprises a ball bearing with a copper sleeve or rim 15 pressed on to the outside of the race. Good electrical continuity is assured by using an electrically conductive lubricant, such as, a lubricant containing graphite. The sleeve is circular in cross-section and thus point-contact is made with conducting plane or sheet 41. Carriage 25 is supported on a length of rail 27, which is held in place by two upright posts 28 mounted on a table 40, and is driven across the plane by means of a motor and belt-drive. Micro-switches 43 mounted at each end of rail 27 are tripped by carriage 25 and reverse the direction of rotation of the motor, thereby reversing the direction of the scanning probe. Said driving motor is a commutator A.-C. type with a forced air cooling system. A pulley system 45 is attached to the frame of carriage 25 and the motor to translate the change of direction of the motor to carriage 25.

While only one scanning wheel has been described hereinbefore the principle of operation can be generalized. For example, in Fig. 2 there is shown an additional probe element 47 suitably mounted on carriage 25 by means of a spring 49 attached at one end to said element and on the other end to an insulating post 51 on said carriage. As shown, the probe element 47 bears on rail 27 by the action of spring contact 49. Said element 47 is also adapted to scan a resistant surface 53. It is observed that probe element 47 is capable of transverse rotational motion on resistive surface 53 and rail 27. The invention can be modified further for scanning curved surfaces.

Obviously many modifications and variations of the present invention are possible in the light of the above teachings. It is therefore to be understood that within the scope of the appended claims the invention may be practiced otherwise than as specifically described.

What is claimed:

1. In combination with a multi-dimensional continuous resistive surface having a potential distribution impressed thereon, means to provide a continuous scan of said resistive surface, said means comprising a carriage having a shaft thereon, a ball bearing having a race rotatably mounted on the shaft of said carriage, and a circular sleeve press-fit onto the race of said bearing, said sleeve having a circular cross-sectional portion for contacting said resistive surface, whereby an almost-point contact made between said sleeve and such resistive surface generates a continuous single line in a transverse direction.

2. A continuous scan contact probe comprising a rail, a carriage adapted for reciprocating motion over said rail, a continuous resistive surface having a potential distribution impressed thereon, and wheel means on said carriage adapted for continuous rolling contact with said resistive surface, said wheel means comprising a ball bearing having a race, and a thin circular sleeve press-fit onto the race of said ball bearing, said sleeve having a circular cross-sectional portion for contacting said resistive surface, whereby an almost-point contact made between said sleeve and said resistive surface generates a continuous single line in a transverse direction.

3. A continuous scan contact probe comprising a rail, a carriage adapted for reciprocating motion over said rail, a multi-dimensional continuous resistive surface having a potential distribution impressed thereon, and wheel means on said carriage adapted for continuous transverse rolling contact with said resistive surface, said wheel comprising a ball bearing having a race, an electrically conductive lubricant on said ball bearing, and a thin circular sleeve press-fit onto the race of said ball bearing, said sleeve having a circular cross-section portion for contacting said resistive surface whereby an almost-point contact made between said sleeve and said resistive surface generates a continuous single line in a transverse direction during operation and the potential distribution in said surface is maintained in its original undistorted form.

References Cited in the file of this patent

UNITED STATES PATENTS

| | | |
|---|---|---|
| 539,105 | Warner | May 14, 1895 |
| 1,706,570 | Elmwall | Mar. 26, 1929 |
| 2,595,189 | Dewan | Apr. 29, 1952 |

FOREIGN PATENTS

| | | |
|---|---|---|
| 632,960 | Great Britain | Dec. 5, 1949 |
| 205,326 | Switzerland | Nov. 5, 1938 |